US012413572B2

(12) United States Patent
Akita

(10) Patent No.: US 12,413,572 B2
(45) Date of Patent: Sep. 9, 2025

(54) AUTHENTICATION SYSTEM, AUTHENTICATION METHOD, AND AUTHENTICATION PROGRAM

(71) Applicant: Konica Minolta, Inc., Tokyo (JP)

(72) Inventor: Katsuhiko Akita, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 250 days.

(21) Appl. No.: 18/143,943

(22) Filed: May 5, 2023

(65) Prior Publication Data

US 2023/0403264 A1 Dec. 14, 2023

(30) Foreign Application Priority Data

Jun. 8, 2022 (JP) ................. 2022-092833

(51) Int. Cl.
*H04L 9/40* (2022.01)

(52) U.S. Cl.
CPC ........ *H04L 63/0823* (2013.01); *H04L 63/102* (2013.01)

(58) Field of Classification Search
CPC .......... H04L 63/0823; H04L 63/102
See application file for complete search history.

(56) References Cited

U.S. PATENT DOCUMENTS

| 10,552,827 B2* | 2/2020 | Sheridan | G06Q 20/363 |
| 2017/0104748 A1* | 4/2017 | Koster | H04L 9/3268 |

FOREIGN PATENT DOCUMENTS

| JP | 2004-272614 A | 9/2004 |
| JP | 2017-55298 A | 3/2017 |
| JP | 2020-80540 A | 5/2020 |

* cited by examiner

*Primary Examiner* — Beemnet W Dada
(74) *Attorney, Agent, or Firm* — RANKIN, HILL & CLARK LLP

(57) ABSTRACT

An authentication system includes: an information processing apparatus; a hardware processor that is connected to the apparatus via a first network and determines propriety of connection to a second network; and a certificate issuing server that is connected to the hardware processor via the second network and issues a certificate including a valid period and permitting the apparatus to connect to the second network, wherein the hardware processor includes a certificate holding part that holds a certificate with which connection has been permitted in a past, verifies a certificate transmitted from the apparatus and determines propriety of connection to the second network, verifies a valid period of a certificate transmitted from the apparatus, permits connection to the second network when the certificate is valid, determines, when the certificate is invalid, whether an identical certificate is held, and permits connection to the second network based on a determination result.

10 Claims, 16 Drawing Sheets

| USER ID | PASSWORD | CERTIFICATE |
|---------|----------|-------------|
| USER A  | aaaaaaaa | CERTIFICATE A |
| USER B  | bbbbbbbb | CERTIFICATE B |
| USER C  | cccccccc | CERTIFICATE C |

FIG. 7

| USER ID | PASSWORD | CERTIFICATE | CONNECTION DATE AND TIME |
|---|---|---|---|
| USER A | aaaaaaaa | CERTIFICATE A | 2021/9/1 8:00 |
| USER B | bbbbbbbb | CERTIFICATE B | 2021/9/2 13:00 |
| USER C | cccccccc | CERTIFICATE C | 2021/9/3 17:00 |

FIG. 9

| USER ID | PASSWORD | CERTIFICATE | MAC ADDRESS |
|---------|----------|-------------|-------------|
| USER A | aaaaaaaa | CERTIFICATE A | aa:aa:aa:aa:aa:aa |
| USER B | bbbbbbbb | CERTIFICATE B | bb:bb:bb:bb:bb:bb |
| USER C | cccccccc | CERTIFICATE C | cc:cc:cc:cc:cc:cc |

FIG. 11

| USER ID | PASSWORD | CERTIFICATE | RESPONSE TO INQUIRY TO ADMINISTRATOR | ADMINISTRATOR CONNECTION PROPRIETY |
|---|---|---|---|---|
| USER A | aaaaaaaa | CERTIFICATE A | DONE | DISABLED |
| USER B | bbbbbbbb | CERTIFICATE B | DONE | ENABLED UNTIL 2021/9/3 00:00 |
| USER C | cccccccc | CERTIFICATE C | UNDONE | DISABLED |

FIG. 14

| USER ID | PASSWORD | CERTIFICATE | NUMBER OF TIMES OF CONNECTION |
|---|---|---|---|
| USER A | aaaaaaaa | CERTIFICATE A | 0 |
| USER B | bbbbbbbb | CERTIFICATE B | 0 |
| USER C | cccccccc | CERTIFICATE C | 1 |

AUTHENTICATION SYSTEM, AUTHENTICATION METHOD, AND AUTHENTICATION PROGRAM

The entire disclosure of Japanese patent Application No. 2022-092833, filed on Jun. 8, 2022, is incorporated herein by reference in its entirety.

BACKGROUND

Technological Field

The present disclosure relates to an authentication system, and particularly to a technology for authenticating a user who uses an information processing apparatus.

Description of the Related Art

With the widespread use of the Internet, an intranet, an in-house LAN, and the like, a system for obtaining necessary information via a network has become indispensable as a social information infrastructure. In such a system, in order to ensure security, it is important to perform transmission and reception of information via a network exclusively for a user having a valid access right within a range of the access right. Therefore, an authentication system is provided, and operation is performed in which a process of authenticating that the access is from a user having a valid access right is performed, and the access is permitted exclusively when proper authentication is made.

In addition, in order to further ensure security, means such as providing a validity term for authentication information or a certificate may be adopted.

In this case, when the access right is uniformly invalidated after expiration of the validity term, there is a possibility that user convenience is degraded. Various methods considering this point have been proposed (see JP 2004-272614 A, JP 2017-055298 A, and JP 2020-080540 A).

However, it is necessary to further improve the method described above in consideration of user convenience while ensuring security.

SUMMARY

The present disclosure is to solve the above problems, and an object thereof is to provide an authentication system, an authentication method, and an authentication program that can be provided for user convenience while ensuring security by a simple method.

To achieve the abovementioned object, according to an aspect of the present invention, an authentication system reflecting one aspect of the present invention comprises: an information processing apparatus; a hardware processor that is connected to the information processing apparatus via a first network and determines propriety of connection to a second network; and a certificate issuing server that is connected to the hardware processor via the second network and issues a certificate including a valid period and permitting the information processing apparatus to connect to the second network, wherein the hardware processor includes a certificate holding part that holds a certificate with which connection has been permitted in a past, verifies a certificate transmitted from the information processing apparatus and determines propriety of connection to the second network, verifies a valid period of a certificate transmitted from the information processing apparatus, permits connection to the second network when the certificate is valid, determines, when the certificate is not valid, whether an identical certificate is held in the certificate holding part, and permits connection to the second network based on a determination result.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a view for explaining an example of an authentication information data table according to Modification 1 of the second embodiment;

FIG. 9 is a view for explaining an example of an authentication information data table according to Modification 2 of the second embodiment;

FIG. 11 is a view for explaining an example of an authentication information data table according to Modification 3 of the second embodiment;

FIG. 14 is a view for explaining an example of an authentication information data table according to Modification 5 of the second embodiment;

DETAILED DESCRIPTION OF EMBODIMENTS

Figure 1:
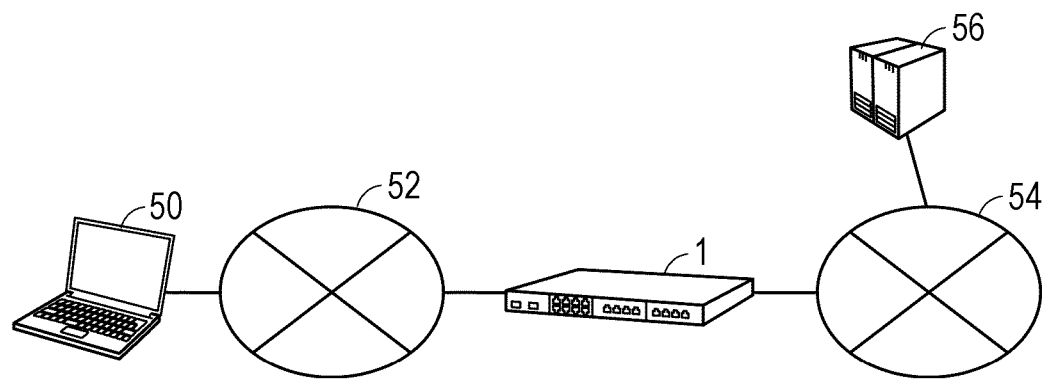
FIG. 1 is a diagram for explaining a configuration of an authentication system according to a first embodiment.

Hereinafter, one or more embodiments of the technical idea of the present invention will be described with reference to the drawings. However, the scope of the invention is not limited to the disclosed embodiments. In the following description, the same reference numerals are given to the

First Embodiment

FIG. 1 is a diagram for explaining a configuration of an authentication system according to a first embodiment. Referring to FIG. 1, an authentication system according to the embodiment includes an authentication server (an authentication device) 1, networks 52 and 54, an information processing apparatus 50 that is a user terminal, and a certificate issuing server 56.

The authentication server 1 is connected to the certificate issuing server 56 via the network 54. The authentication server 1 is connected to the information processing apparatus 50 via the network 52.

A case is considered in which the network 52 is, as an example, the Internet, and the network 54 is, as an example, an intranet.

The certificate issuing server 56 issues a certificate including a valid period and permitting connection to the network 54. The authentication server 1 uses the certificate to determine propriety of connection to the network 54.

The information processing apparatus 50, which is a user terminal, is provided so as to be able to communicate with the authentication server 1 via the network 52, and executes authentication processing by exchanging data with the authentication server 1 at the time of connection to a device connected to the network 54. The authentication server 1 executes authentication processing of authenticating that an access from the information processing apparatus 50 is an access from a user having a valid access right, and an access to the device connected to the network 54 is permitted when proper authentication is made.

In the present example, a case where the certificate issuing server 56 is connected to the network 54 is illustrated. However, without limiting to this, a configuration may be adopted in which another server is connected and can be accessed from the information processing apparatus 50. Furthermore, a case is illustrated in which one information processing apparatus 50 is connected to the network 52. However, without limiting to this, a configuration may also be adopted in which a plurality of information processing apparatuses are connected.

Furthermore, in the present example, a case where the information processing apparatus 50 is a personal computer (PC) will be described as an example. However, without limiting to this, the information processing apparatus 50 may be, for example, a multi functional peripheral (MFP), a printer, a copier, or a facsimile, as an image forming apparatus that is one type of information processing apparatus.

Figure 2:
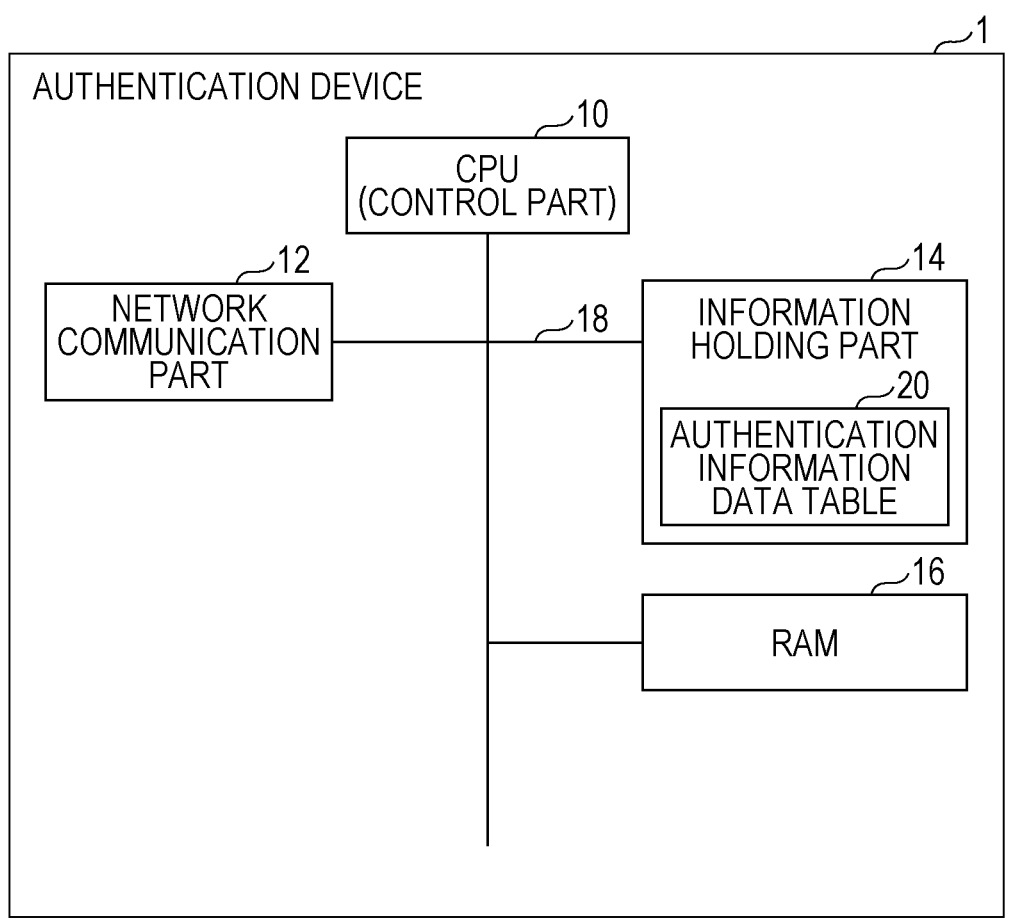
FIG. 2 is a diagram for explaining a configuration of an authentication server according to the first embodiment.

FIG. 2 is a diagram for explaining a configuration of the authentication server 1 according to the first embodiment. Referring to FIG. 2, the authentication server 1 receives an access from the information processing apparatus 50 and executes authentication processing of authenticating that the access is from a user having a valid access right, and permits an access to the device connected to the network 54 when proper authentication is made.

The authentication server 1 includes a CPU (a control part) 10, a network communication part 12, an information holding part 14, and a RAM 16.

An antenna (not illustrated), a wireless module, and the like are connected to the network communication part 12. The authentication server 1 exchanges data between with an external communication device via a network via an antenna or a wireless or wired module. The external communication device may be, for example, a portable communication terminal such as a PC or a smartphone, which is one type of the information processing apparatus 50.

The CPU 10 controls an operation of the authentication server 1 by executing various programs of the authentication server 1. The CPU 10 reads the program from the information holding part 14 to the RAM 16 on the basis of reception of an execution command of the program. The RAM 16 functions as a working memory, and temporarily stores various data necessary for executing the program. The RAM 16 may be a nonvolatile memory.

In the present example, the information holding part 14 includes an authentication information data table 20. The authentication information data table 20 includes authentication information to be used for the authentication processing.

The information holding part 14 can be provided as a nonvolatile memory as an example, and is, for example, a hard disk, a solid state drive (SSD), or another storage device. The information holding part 14 may be either a built-in type or an external type. The information holding part 14 stores a program and the like according to the embodiment. However, a storage location of the program is not limited to the information holding part 14, and the program may be stored in a ROM, a RAM, an external device (for example, a server), or the like. The program may be provided not as a single program but by being incorporated in a part of any program. In this case, control processing according to the present embodiment is implemented in cooperation with any program. Even such a program not including some of modules does not depart from the purport of the program according to the embodiment. Further, some or all of the functions provided by the program may be implemented by dedicated hardware. Further, the authentication server 1 may be implemented in a form of a so-called cloud service in which at least one server executes a part of processing of a program.

Figures 3, 4:
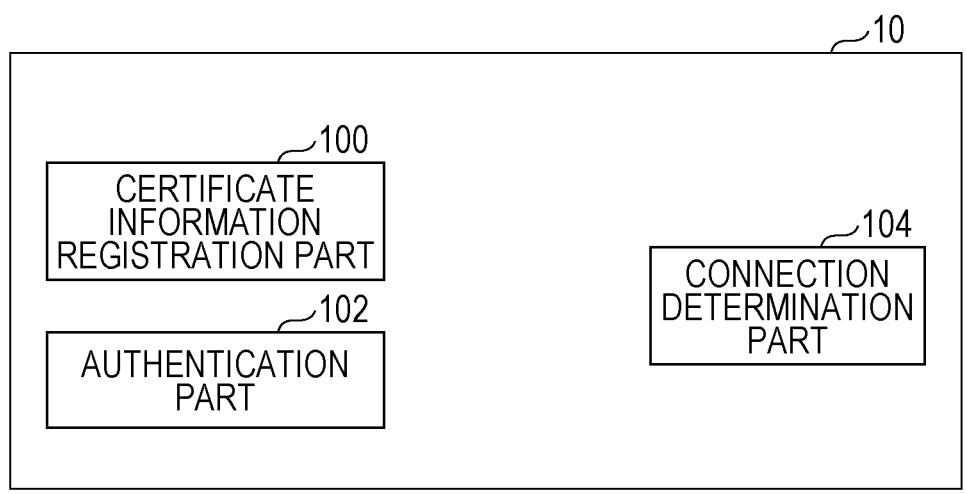
FIG. 3 is a diagram for explaining functional blocks of the authentication server according to the first embodiment.
FIG. 4 is a view for explaining an example of an authentication information data table according to the first embodiment.

FIG. 3 is a diagram for explaining functional blocks of the authentication server 1 according to the first embodiment. Referring to FIG. 3, in the authentication server 1, the CPU 10 executes a program stored in the information holding part 14, to implement functional blocks in cooperation with various types of hardware.

The authentication server 1 includes a registration part 100, an authentication part 102, and a connection determination part 104.

The registration part 100 registers received certificate data into the authentication information data table of the information holding part 14.

The authentication part 102 executes authentication processing of authenticating that an access from the information processing apparatus 50 is an access from a user having a valid access right.

The connection determination part 104 permits an access to the network 54 when proper authentication is made as an authentication result of the authentication part 102.

FIG. 4 is a view for explaining an example of the authentication information data table 20 according to the first embodiment. Referring to FIG. 4, the authentication information data table includes a plurality of pieces of authentication information.

Specifically, the authentication information data table includes a user ID, a password, and certificate data.

As an example, a password ("aaaaaaa") and certificate data ("certificate A") are registered in association with a user ID ("user A").

Further, a password ("bbbbbbb") and certificate data ("certificate B") are registered in association with a user ID ("user B").

In addition, a password ("ccccccc") and certificate data ("certificate C") are registered in association with a user ID ("user C").

The authentication part 102 performs authentication processing on the basis of the authentication information registered in the authentication information data table.

In an initial state, in the authentication information data table, the user ID and the password are registered, and no certificate data is registered. In addition, an administrator of the authentication server 1 may register the user ID and the password in advance, or user information may be acquired from an external server.

Figure 5:
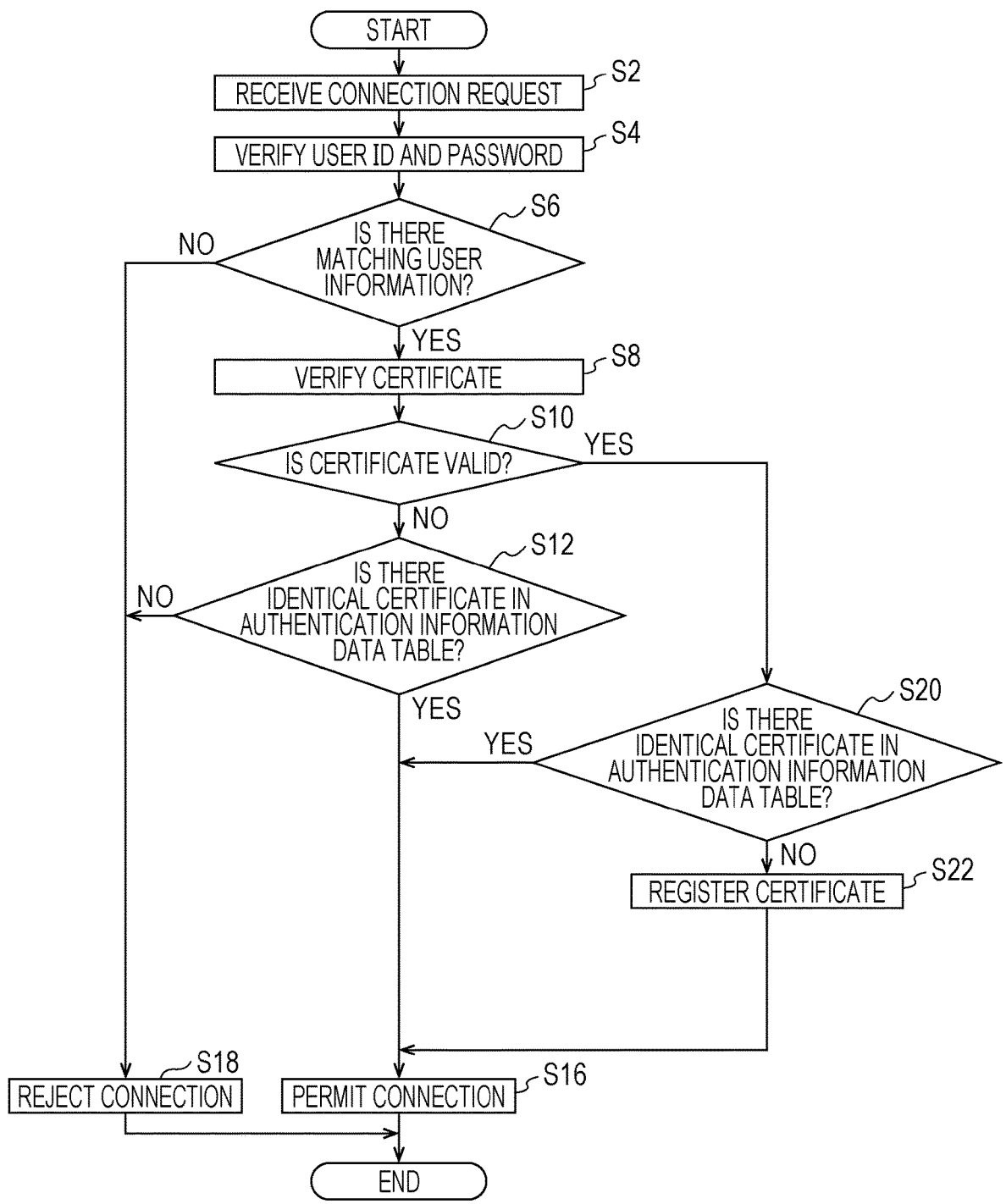
FIG. 5 is a flowchart for explaining processing of the authentication server according to the first embodiment.

FIG. 5 is a flowchart for explaining processing of the authentication server 1 according to the first embodiment. Referring to FIG. 5, the authentication part 102 receives a connection request from the information processing apparatus 50 (step S2). The authentication part 102 receives, as a connection request, a user ID and a password from the information processing apparatus 50 and a certificate issued by the certificate issuing server 56.

Next, the authentication part 102 verifies the user ID and the password received as the connection request (step S4).

Next, the authentication part 102 determines whether or not there is matching user information in the authentication information data table 20 (step S6). The authentication part 102 refers to the authentication information data table 20, and determines whether or not the received user ID and password are registered in the authentication information data table 20.

When the authentication part 102 determines in step S6 that there is matching user information in the authentication information data table 20 (YES in step S6), next, the authentication part 102 verifies the certificate (step S8). When the received user ID and password have been registered in the authentication information data table 20, the authentication part 102 determines that there is matching user information and verifies the associated certificate. Specifically, the authentication part 102 executes verification processing or the like of an issuer, a name of an attestation target, and the like described in the certificate.

Next, the authentication part 102 determines whether or not the certificate is valid (step S10). The authentication part 102 checks a validity term described in the certificate, and determines whether or not the certificate is within the validity term.

When the authentication part 102 determines in step S10 that the certificate is valid (YES in step S10), the authentication part 102 determines whether or not there is an identical certificate in the authentication information data table 20 (step S20). The authentication part 102 refers to the authentication information data table 20, and determines whether or not the received certificate is identical to a certificate registered in the authentication information data table 20.

When the authentication part 102 determines in step S20 that there is no identical certificate in the authentication information data table 20 (NO in step S20), the authentication part 102 instructs the registration part 100, and the registration part 100 registers the certificate in the authentication information data table 20 (step S22). When the authentication part 102 determines that the certificate is valid but the certificate is not registered yet in the authentication information data table 20 with reference to the authentication information data table 20, the authentication part 102 instructs the registration part 100. The registration part 100 registers the certificate in association with user information in the authentication information data table 20.

Next, the connection determination part 104 permits connection to a device connected to the network 54 (step S16). The connection determination part 104 permits connection to the device connected to the network 54 and designated as a connection destination by the information processing apparatus 50.

Then, the process ends (END).

Whereas, when the authentication part 102 determines in step S20 that there is an identical certificate in the authentication information data table 20 (YES in step S20), the authentication part 102 skips the processing in step S22 and instructs the connection determination part 104, and the connection determination part 104 permits connection to the device connected to the network 54 (step S16). When the authentication part 102 determines that the certificate is valid and the certificate has already been registered in the authentication information data table 20 with reference to the authentication information data table 20, the authentication part 102 instructs the connection determination part 104, and the connection determination part 104 permits connection to the device connected to the network 54 and designated as a connection destination by the information processing apparatus 50.

Then, the process ends (END).

Whereas, when the authentication part 102 determines in step S10 that the certificate is not valid (NO in step S10), the authentication part 102 determines whether or not there is an identical certificate in the authentication information data table 20 (step S12). The authentication part 102 refers to the authentication information data table and determines whether or not the received certificate is identical to a certificate registered in the authentication information data table 20.

When the authentication part 102 determines in step S12 that there is an identical certificate in the authentication information data table 20 (YES in step S12), the authentication part 102 instructs the connection determination part 104, and the connection determination part 104 permits connection to the device connected to the network 54 (step S16). When the authentication part 102 determines that the certificate is invalid but a certificate identical to the certificate has been registered in the authentication information data table 20 with reference to the authentication information data table 20, the authentication part 102 instructs the connection determination part 104, and the connection determination part 104 permits connection to the device connected to the network 54 and designated as a connection destination by the information processing apparatus 50.

Then, the process ends (END).

Whereas, when the authentication part 102 determines in step S12 that there is no identical certificate in the authentication information data table 20 (NO in step S12), the authentication part 102 instructs the connection determination part 104, and the connection determination part 104 rejects connection to the device connected to the network 54 (step S18).

Then, the process ends (END).

Whereas, when the authentication part 102 determines in step S6 that there is no matching user information in the authentication information data table 20 (NO in step S6), the authentication part 102 instructs the connection determination part 104, and the connection determination part 104 rejects connection to the device connected to the network 54 (step S18).

Then, the process ends (END).

According to the method described above, even if the certificate is not valid, in a case where an identical certificate has been registered in the authentication information data table 20, the authentication part 102 instructs the connection determination part 104, and the connection determination part 104 permits connection to the device connected to the network 54 and designated as a connection destination by the information processing apparatus 50.

Conventionally, when the certificate is not valid, the authentication server 1 rejects connection to the device connected to the network 54 and designated as a connection destination by the information processing apparatus 50, and thus, there has been degradation in user convenience.

In particular, in a case where the network 54 and the certificate issuing server 56 are connected, a complicated measure has been required such as requesting an administrator to perform a certificate reissuance procedure since there is no means for reissuing a certificate from the information processing apparatus 50 connected to the network 52.

In the first embodiment, even if the certificate is not valid, the authentication server 1 stores a certificate with which connection has been made in the past and can permit the connection, when there is a connection request with the identical certificate by using the certificate. Therefore, it is possible to provide user convenience while ensuring security by a simple method.

Second Embodiment

In a second embodiment, a method for further enhancing security will be described.

Figure 6:
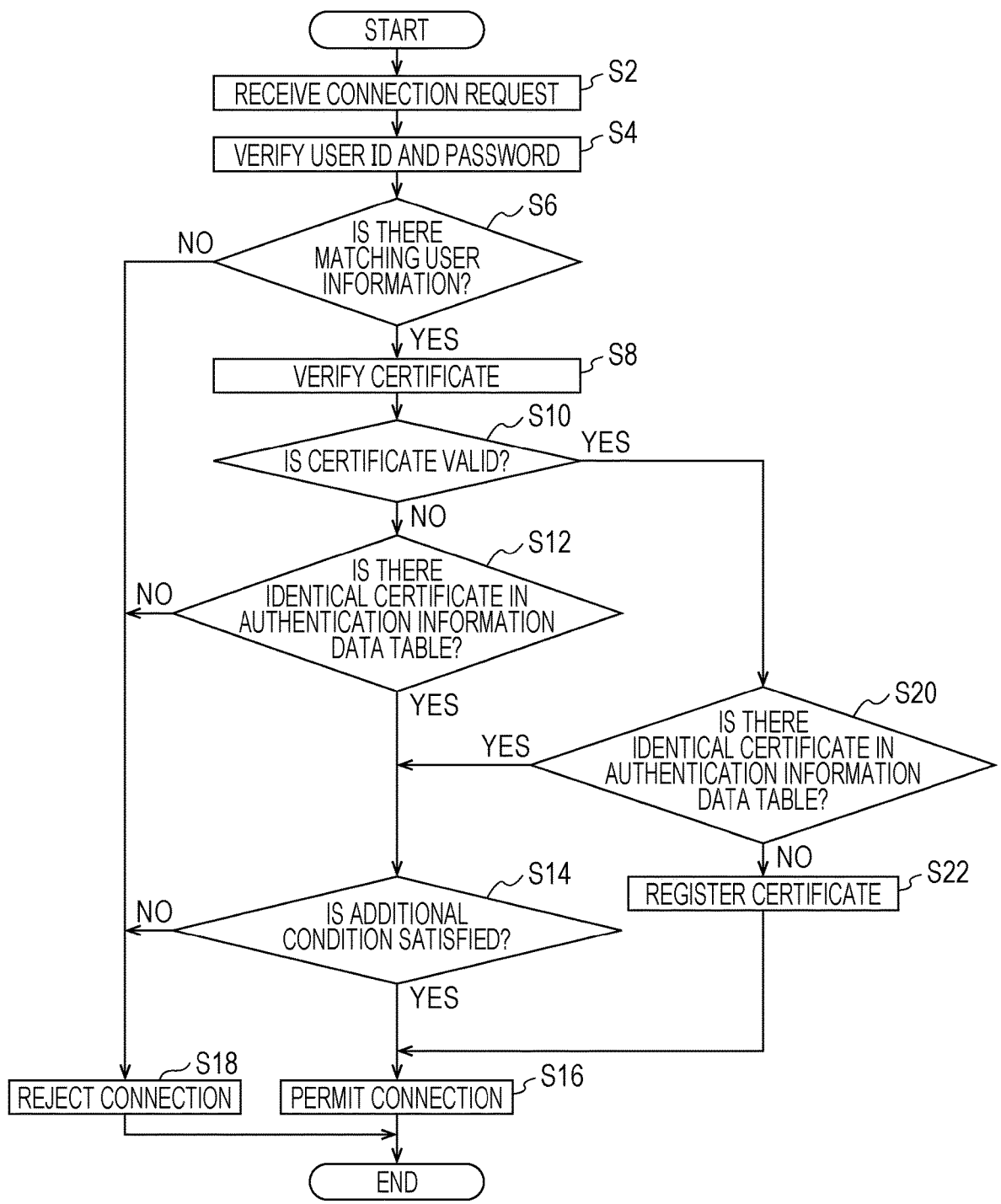
FIG. 6 is a flowchart for explaining processing of an authentication server according to a second embodiment.

FIG. 6 is a flowchart for explaining processing of an authentication server 1 according to the second embodiment. Referring to FIG. 6, a different point from the flowchart of FIG. 5 is that step S14 is added. Since other points are similar, the detailed description thereof will not be repeated.

When an authentication part 102 determines in step S12 that there is an identical certificate in an authentication information data table 20 (YES in step S12), the authentication part 102 determines whether or not an additional condition is satisfied (step S14).

When the authentication part 102 determines in step S14 that the additional condition is satisfied (YES in step S14), the authentication part 102 instructs a connection determination part 104, and the connection determination part 104 permits connection to a device connected to a network 54 (step S16). When the authentication part 102 determines that the certificate is invalid but a certificate identical to the certificate has been registered in the authentication information data table 20 with reference to the authentication information data table and the additional condition is satisfied, the authentication part 102 instructs the connection determination part 104, and the connection determination part 104 permits connection to the device connected to the network 54 and designated as a connection destination by an information processing apparatus 50.

Then, the process ends (END).

Whereas, when the authentication part 102 determines in step S14 that the additional condition is not satisfied (NO in step S14), the authentication part 102 instructs the connection determination part 104, and the connection determination part 104 rejects connection to the device connected to the network 54 (step S18).

Then, the process ends (END).

According to the method described above, even if the certificate is not valid, in a case where an identical certificate has been registered in the authentication information data table 20 and the additional condition is satisfied, the authentication part 102 instructs the connection determination part 104, and the connection determination part 104 permits connection to the device connected to the network 54 and designated as a connection destination by the information processing apparatus 50.

In the second embodiment, even if the certificate is not valid, the authentication server 1 stores a certificate with which connection has been made in the past and can permit the connection when the additional condition is satisfied, when there is a connection request with the identical certificate by using the certificate. Therefore, it is possible to provide user convenience while further ensuring security by a simple method.

(Modification 1)

FIG. 7 is a view for explaining an example of an authentication information data table 20 according to Modification 1 of the second embodiment. Referring to FIG. 7, the authentication information data table includes a plurality of pieces of authentication information.

The authentication information data table illustrated in FIG. 7 further includes a connection date and time, as compared with the authentication information data table in FIG. 5. Other points are similar to those of the authentication information data table in FIG. 5, and thus the detailed description thereof will not be repeated.

As an example, a password ("aaaaaaa"), certificate data ("certificate A"), and a connection date and time ("2021/9/1 8:00") are registered in association with a user ID ("user A").

Further, a password ("bbbbbbb"), certificate data ("certificate B"), and a connection date and time ("2021/9/2 13:00") are registered in association with a user ID ("user B").

In addition, a password ("ccccccc"), certificate data ("certificate C"), and a connection date and time ("2021/9/3 17:00") are registered in association with a user ID ("user C").

The authentication part 102 performs authentication processing on the basis of the authentication information registered in the authentication information data table.

Figure 8:
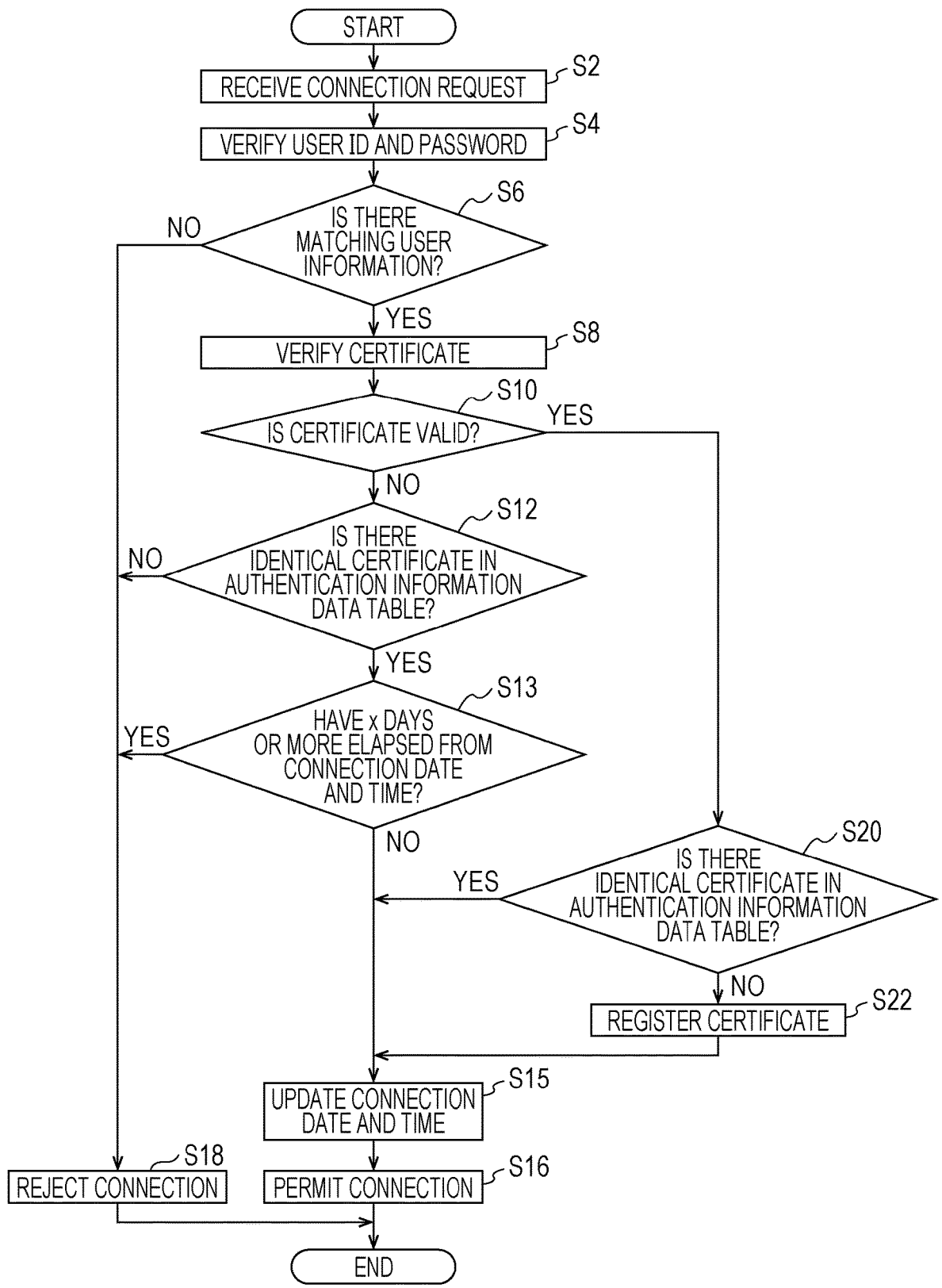
FIG. 8 is a flowchart for explaining processing of an authentication server according to Modification 1 of the second embodiment.

FIG. 8 is a flowchart for explaining processing of an authentication server 1 according to Modification 1 of the second embodiment. Referring to FIG. 8, a different point from the flowchart of FIG. 6 is that steps S13 and S15 are added instead of step S14. Since other points are similar, the detailed description thereof will not be repeated.

When the authentication part 102 determines in step S12 that there is an identical certificate in the authentication information data table 20 (YES in step S12), the authentication part 102 determines whether or not x days or more have elapsed from the connection date and time (step S13).

When the authentication part 102 determines in step S13 that x days or more have not elapsed from the connection date and time (NO in step S13), the authentication part 102 instructs the connection determination part 104, and the connection determination part 104 permits connection to a device connected to the network 54 (step S16). When the authentication part 102 determines that the certificate is invalid but a certificate identical to the certificate has been registered in the authentication information data table 20 with reference to the authentication information data table 20, and the elapsed days from the previous connection date and time is less than x days, the authentication part 102 instructs the connection determination part 104, and the connection determination part 104 permits connection to the device connected to the network 54 and designated as a connection destination by the information processing apparatus 50.

Next, the authentication part 102 instructs a registration part 100, and the registration part 100 updates the connection date and time in the authentication information data table 20 (step S15).

Then, the process ends (END).

Whereas, when the authentication part 102 determines in step S13 that x days or more have elapsed from the connection date and time (NO in step S13), the authentication part 102 instructs the connection determination part 104, and the connection determination part 104 rejects connection to the network 54 (step S18).

Then, the process ends (END).

In step S22, the registration part 100 registers the certificate in the authentication information data table and updates the connection date and time in the authentication information data table 20 (step S15).

Next, the connection determination part 104 permits connection to a device connected to the network 54 (step S16). The connection determination part 104 permits connection to the device connected to the network 54 and designated as a connection destination by the information processing apparatus 50.

Then, the process ends (END).

According to the method described above, even if the certificate is not valid, in a case where an identical certificate has been registered in the authentication information data table 20 and the elapsed days from the connection date and time is less than x days, the authentication part 102 instructs the connection determination part 104, and the connection determination part 104 permits connection to the device connected to the network 54 and designated as a connection destination by the information processing apparatus 50.

In Modification 1 of the second embodiment, even if the certificate is not valid, the authentication server 1 stores a certificate with which connection has been made in the past and can permit the connection when elapsed days from the connection date and time is less than x days, when there is a connection request with the identical certificate by using the certificate. Therefore, it is possible to provide user convenience while further ensuring security by a simple method.

(Modification 2)

FIG. 9 is a view for explaining an example of an authentication information data table 20 according to Modification 2 of the second embodiment. Referring to FIG. 9, the authentication information data table includes a plurality of pieces of authentication information.

The authentication information data table illustrated in FIG. 9 further includes a MAC address, as compared with the authentication information data table in FIG. 5. Other points are similar to those of the authentication information data table in FIG. 5, and thus the detailed description thereof will not be repeated.

As an example, a password ("aaaaaaa"), certificate data ("certificate A"), and a MAC address ("aa:aa:aa:aa:aa:aa") are registered in association with a user ID ("user A").

Further, a password ("bbbbbbb"), certificate data ("certificate B"), and a MAC address ("bb:bb:bb:bb:bb:bb") are registered in association with a user ID ("user B").

In addition, a password ("ccccccc"), certificate data ("certificate C"), and a MAC address ("cc:cc:cc:cc:cc:cc") are registered in association with a user ID ("user C").

The authentication part 102 performs authentication processing on the basis of the authentication information registered in the authentication information data table.

Figure 10:
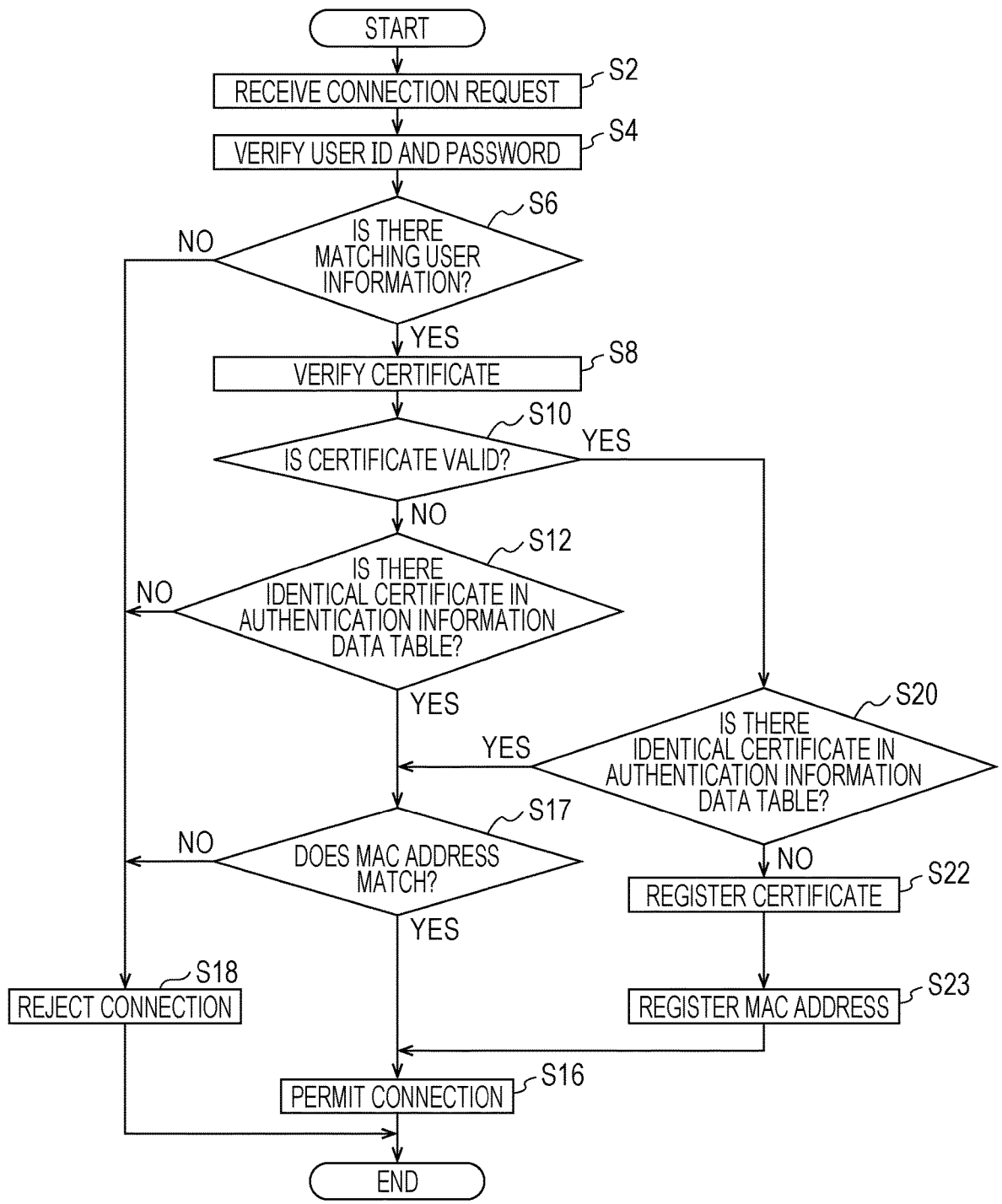
FIG. 10 is a flowchart for explaining processing of an authentication server according to Modification 2 of the second embodiment.

FIG. 10 is a flowchart for explaining processing of an authentication server 1 according to Modification 2 of the second embodiment. Referring to FIG. 10, a different point from the flowchart of FIG. 6 is that steps S17 and S23 are added instead of step S14. Since other points are similar, the detailed description thereof will not be repeated.

When the authentication part 102 determines in step S12 that there is an identical certificate in the authentication information data table 20 (YES in step S12), the authentication part 102 determines whether or not the MAC address matches (step S17).

When the authentication part 102 determines in step S17 that the MAC address matches (YES in step S17), the authentication part 102 instructs the connection determination part 104, and the connection determination part 104 permits connection to a device connected to the network 54 (step S16). When the authentication part 102 determines that the certificate is invalid but a certificate identical to the certificate has been registered in the authentication information data table 20 with reference to the authentication information data table 20, and the MAC address matches, the authentication part 102 instructs the connection determination part 104, and the connection determination part 104 permits connection to the device connected to the network 54 and designated as a connection destination by the information processing apparatus 50.

Then, the process ends (END).

Whereas, when the authentication part 102 determines in step S17 that the MAC address does not match (NO in step S17), the authentication part 102 instructs the connection determination part 104, and the connection determination part 104 rejects connection to the device connected to the network 54 (step S18).

Then, the process ends (END).

In step S22, the registration part 100 registers the certificate in the authentication information data table and registers the MAC address in the authentication information data table 20 (step S23). The MAC address can be acquired together with the user ID when the connection request is received.

Next, the connection determination part 104 permits connection to the network 54 (step S16). The connection determination part 104 permits connection to the device connected to the network 54 and designated as a connection destination by the information processing apparatus 50.

Then, the process ends (END).

According to the method described above, even if the certificate is not valid, in a case where an identical certificate has been registered in the authentication information data table 20 and the MAC address is identical, the authentication part 102 instructs the connection determination part 104, and the connection determination part 104 permits connection to the device connected to the network 54 and designated as a connection destination by the information processing apparatus 50.

In Modification 2 of the second embodiment, even if the certificate is not valid, the authentication server 1 stores a certificate with which connection has been made in the past and can permit the connection when the MAC address matches, when there is a connection request with the identical certificate by using the certificate. Therefore, it is possible to provide user convenience while further ensuring security by a simple method.

Note that, in the present example, the MAC address has been described as an example of information related to the information processing apparatus. However, without limiting to this, any information may be used as long as the information can specify the information processing apparatus.

(Modification 3)

FIG. 11 is a view for explaining an example of an authentication information data table 20 according to Modification 3 of the second embodiment. Referring to FIG. 11, the authentication information data table includes a plurality of pieces of authentication information.

The authentication information data table illustrated in FIG. 11 further includes a response to an inquiry to the administrator and information on administrator connection propriety, as compared with the authentication information data table of FIG. 5. Other points are similar to those of the authentication information data table in FIG. 5, and thus the detailed description thereof will not be repeated.

As an example, a password ("aaaaaaa"), certificate data ("certificate A"), a response to an inquiry to the administrator ("done"), and administrator connection propriety ("disabled") are registered in association with a user ID ("user A").

Further, a password ("bbbbbbb"), certificate data ("certificate B"), a response to an inquiry to the administrator ("done"), and administrator connection propriety ("enabled until 2021/9/3 00:00") are registered in association with the user ID ("user B").

In addition, a password ("ccccccc"), certificate data ("certificate C"), a response to an inquiry to the administrator ("undone"), and administrator connection propriety ("disabled") are registered in association with the user ID ("user C").

The authentication part 102 performs authentication processing on the basis of the authentication information registered in the authentication information data table.

Figure 12:
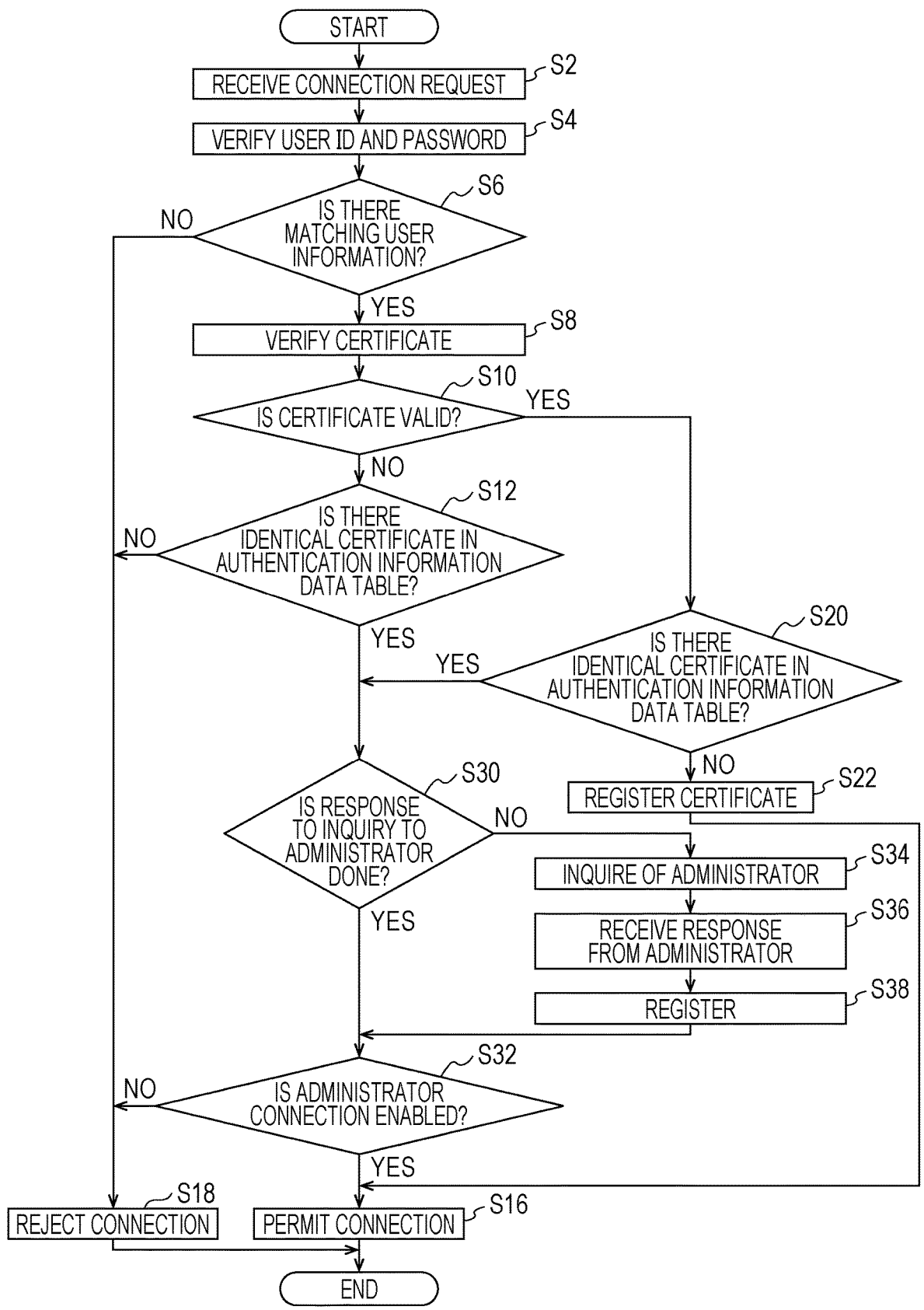
FIG. 12 is a flowchart for explaining processing of an authentication server according to Modification 3 of the second embodiment.

FIG. 12 is a flowchart for explaining processing of an authentication server 1 according to Modification 3 of the second embodiment. Referring to FIG. 10, a different point from the flowchart of FIG. 6 is that steps S30 to S38 are added instead of step S14. Since other points are similar, the detailed description thereof will not be repeated.

When the authentication part 102 determines in step S12 that there is an identical certificate in the authentication information data table 20 (YES in step S12), the authentication part 102 determines whether or not a response to an inquiry to the administrator is done (step S30). The authentication part 102 refers to the authentication information data table 20 and determines whether the response to the inquiry to the administrator of the authentication information data table 20 is "done".

When the authentication part 102 determines in step S30 that the response to the inquiry to the administrator is "done" (YES in step S30), the authentication part 102 determines whether or not connection by the administrator is permitted (step S32). The authentication part 102 refers to the authentication information data table 20 and determines whether the administrator connection propriety of the authentication information data table 20 is "enabled". If another condition has been added, it is determined whether or not the condition is satisfied. For example, since there is a condition of the administrator connection propriety ("2021/9/3 enabled until 00:00") in a case of the user ID ("user B") in FIG. 11, it is also determined whether or not the condition of the period is satisfied.

When the authentication part 102 determines in step S32 that the connection by the administrator is permitted (YES in step S32), the authentication part 102 instructs the connection determination part 104, and the connection determination part 104 permits connection to the device connected to the network 54 (step S16). When the authentication part 102 determines that the certificate is invalid but a certificate identical to the certificate has been registered in the authentication information data table 20 with reference to the authentication information data table 20, and the authentication part 102 determines that the connection by the administrator is permitted, the authentication part 102 instructs the connection determination part 104, and the connection determination part 104 permits connection to the device connected to the network 54 and designated as a connection destination by the information processing apparatus 50.

Then, the process ends (END).

Whereas, when the authentication part 102 determines in step S30 that the response to the inquiry to the administrator is not "done" (NO in step S30), the authentication part executes inquiry to the administrator (step S34). The authentication part 102 transmits inquiry information on connection propriety, to a terminal of the administrator (not illustrated). The administrator can respond to the inquiry information from the authentication part 102. For example, it is possible to permit connection or to permit connection with an additional condition of a period.

Next, the authentication part 102 receives a response from the administrator (step S36). The authentication part 102 receives a response to inquiry information on connection propriety from the terminal of the administrator. Specifically, the authentication part 102 receives a response such as connectable or unconnectable, or permission of connection with additional condition of a period.

Next, the authentication part 102 instructs the registration part 100, and the registration part 100 registers the response from the administrator in association with the user information in the authentication information data table 20 (step S38).

Next, the authentication part 102 determines whether or not connection by the administrator is permitted (step S32). The subsequent processing is similar.

Whereas, when the authentication part 102 determines in step S32 that the connection by the administrator is not permitted (NO in step S32), the authentication part 102 instructs the connection determination part 104, and the connection determination part 104 rejects connection to the device connected to the network 54 (step S18).

Then, the process ends (END).

According to the method described above, even if the certificate is not valid, in a case where an identical certificate has been registered in the authentication information data table 20, and the connection by the administrator is permitted, the authentication part 102 instructs the connection determination part 104, and the connection determination part 104 permits connection to the device connected to the network 54 and designated as a connection destination by the information processing apparatus 50.

In Modification 3 of the second embodiment, even if the certificate is not valid, the authentication server 1 stores a certificate with which connection has been made in the past and can permit the connection when the administrator permits the connection, when there is a connection request with the identical certificate by using the certificate. Therefore, it is possible to provide user convenience while further ensuring security by a simple method.

(Modification 4)

Figure 13:
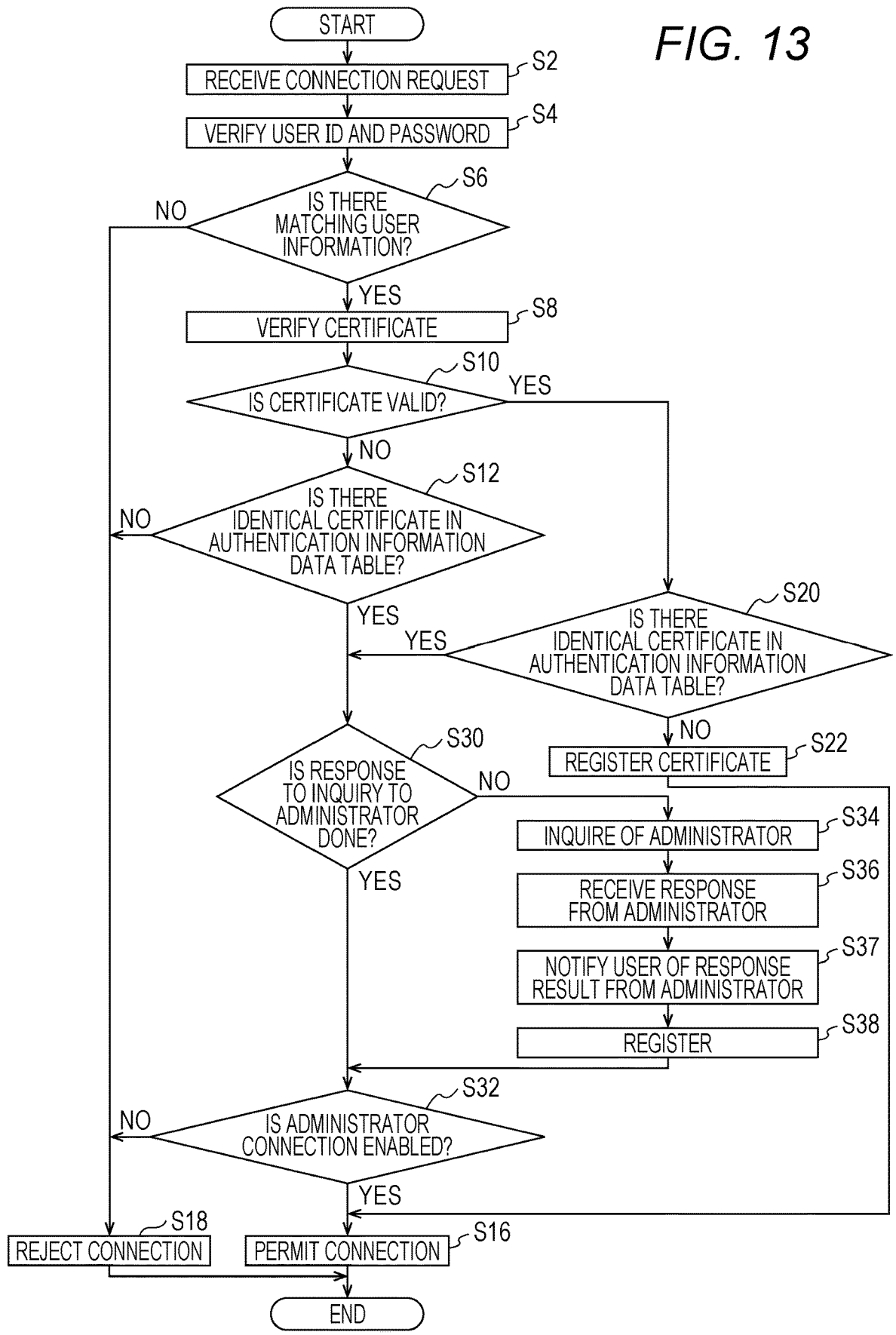
FIG. 13 is a flowchart for explaining processing of an authentication server according to Modification 4 of the second embodiment.

FIG. 13 is a flowchart for explaining processing of an authentication server 1 according to Modification 4 of the second embodiment. Referring to FIG. 13, a different point from the flowchart of FIG. 12 is that step S37 is added. Since other points are similar, the detailed description thereof will not be repeated.

In step S36, the authentication part 102 receives a response from the administrator, and then, the authentication part 102 notifies the information processing apparatus 50 of the user of a response result from the administrator (step S37). Since the user can check the notification of the response result from the administrator, the convenience is improved by checking connection propriety.

Next, the authentication part 102 instructs the registration part 100, and the registration part 100 registers the response from the administrator in association with the user information in the authentication information data table 20 (step S38). The subsequent processing is similar.

According to the method described above, even if the certificate is not valid, in a case where an identical certificate has been registered in the authentication information data table 20, and the connection by the administrator is permitted, the authentication part 102 instructs the connection determination part 104, and the connection determination part 104 permits connection to the device connected to the network 54 and designated as a connection destination by the information processing apparatus 50.

In Modification 4 of the second embodiment, even if the certificate is not valid, the authentication server 1 stores a certificate with which connection has been made in the past, can permit connection when the administrator permits the connection, and can notify the user of the response result from the administrator, when there is a connection request with the identical certificate by using the certificate. Therefore, it is possible to provide user convenience while further ensuring security by a simple method.

(Modification 5)

FIG. 14 is a view for explaining an example of an authentication information data table 20 according to Modification 5 of the second embodiment. Referring to FIG. 14, the authentication information data table includes a plurality of pieces of authentication information.

The authentication information data table illustrated in FIG. 14 further includes the number of times of connection, as compared with the authentication information data table in FIG. 5. Other points are similar to those of the authentication information data table in FIG. 5, and thus the detailed description thereof will not be repeated.

As an example, a password ("aaaaaaa"), certificate data ("certificate A"), and the number of times of connection ("0") are registered in association with a user ID ("user A").

Further, a password ("bbbbbbb"), certificate data ("certificate B"), and the number of times of connection ("0") are registered in association with a user ID ("user B").

In addition, a password ("ccccccc"), certificate data ("certificate C"), and the number of times of connection ("1") are registered in association with a user ID ("user C").

The authentication part 102 performs authentication processing on the basis of the authentication information registered in the authentication information data table.

Figure 15:
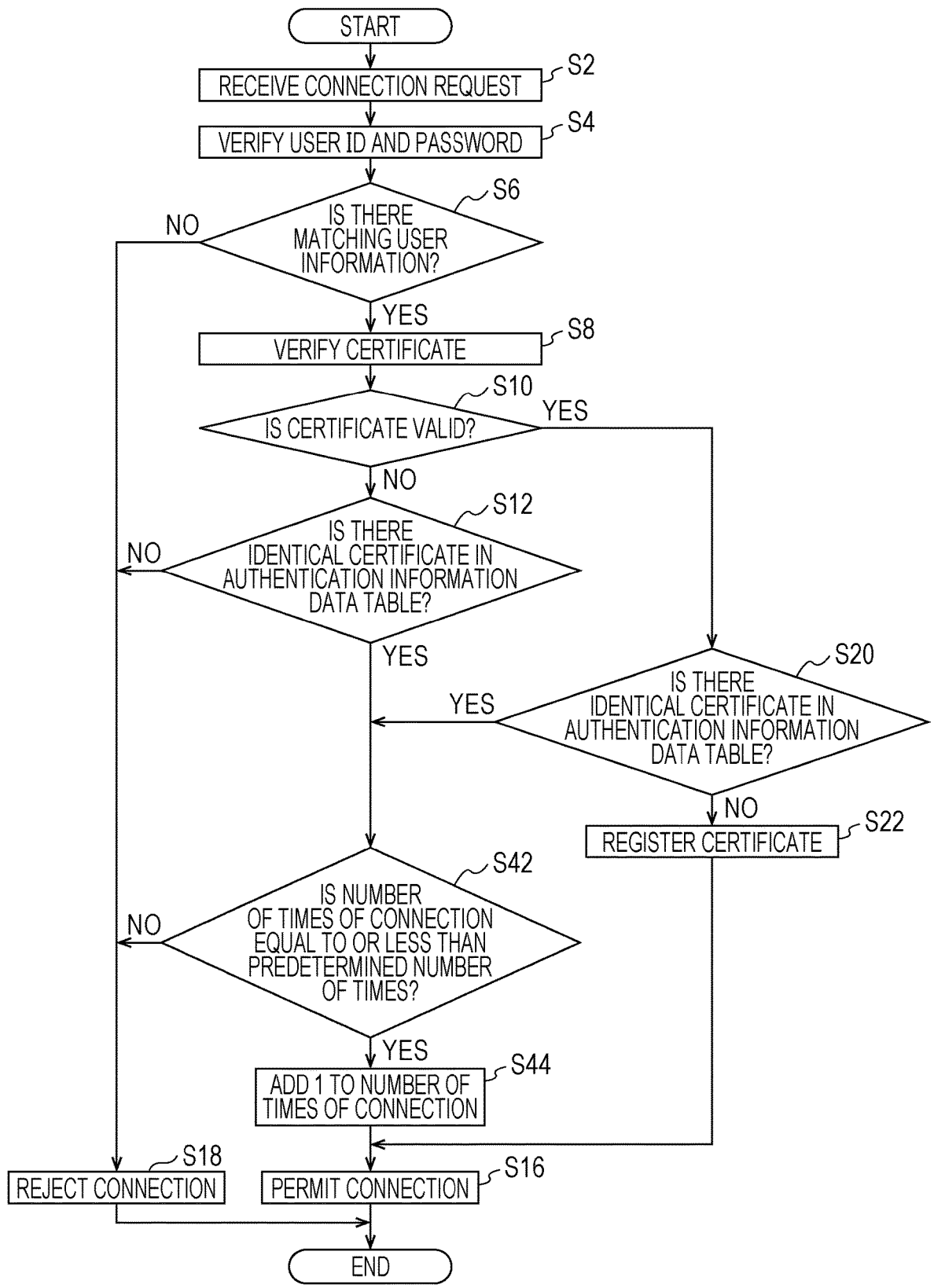
FIG. 15 is a flowchart for explaining processing of an authentication server according to Modification 5 of the second embodiment.

FIG. 15 is a flowchart for explaining processing of an authentication server 1 according to Modification 5 of the second embodiment. Referring to FIG. 15, a different point from the flowchart of FIG. 6 is that steps S42 and S44 are added instead of step S14. Since other points are similar, the detailed description thereof will not be repeated.

When the authentication part 102 determines in step S12 that there is an identical certificate in the authentication information data table 20 (YES in step S12), the authentication part 102 determines whether or not the number of times of connection is equal to or less than a predetermined number of times (step S42). As an example, the predetermined number of times may be set to three times. Note that the predetermined number of times can be appropriately changed by the administrator.

When the authentication part 102 determines in step S42 that the number of times of connection is equal to or less than the predetermined number of times (YES in step S42), the authentication part 102 instructs the registration part 100, and the registration part 100 counts up ("+1") the number of times of connection in the authentication information data table 20 (step S44).

Then, the authentication part 102 instructs the connection determination part 104, and the connection determination part 104 permits connection to the network 54 (step S16). When the authentication part 102 determines that the certificate is invalid but a certificate identical to the certificate has been registered in the authentication information data table 20 with reference to the authentication information data table 20, and the number of times of connection is equal to or less than the predetermined number of times, the authentication part 102 instructs the connection determination part 104, and the connection determination part 104 permits connection to the device connected to the network 54 and designated as a connection destination by the information processing apparatus 50.

Then, the process ends (END).

Whereas, when the authentication part 102 determines in step S42 that the number of times of connection is not equal to or less than the predetermined number of times (NO in step S42), the authentication part 102 instructs the connection determination part 104, and the connection determination part 104 rejects connection to the device connected to the network 54 (step S18).

Then, the process ends (END).

According to the method described above, even if the certificate is not valid, in a case where an identical certificate has been registered in the authentication information data table 20 and the number of times of connection is equal to or less than a predetermined number of times, the authentication part 102 instructs the connection determination part 104, and the connection determination part 104 permits connection to the device connected to the network 54 and designated as a connection destination by the information processing apparatus 50.

In Modification 5 of the second embodiment, even if the certificate is not valid, the authentication server 1 stores a certificate with which connection has been made in the past and can permit connection when the number of times of connection is within a predetermined number of times, when there is a connection request with the identical certificate by using the certificate. Therefore, it is possible to provide user convenience while further ensuring security by a simple method.

In the present example, a method of counting up the number of times of connection and permitting connection when the number of times of connection is equal to or less than the predetermined number of times has been described. However, the number of times for connection permission may be set in advance, and connection may be permitted exclusively for the number of times.

(Modification 6)

Figure 16:
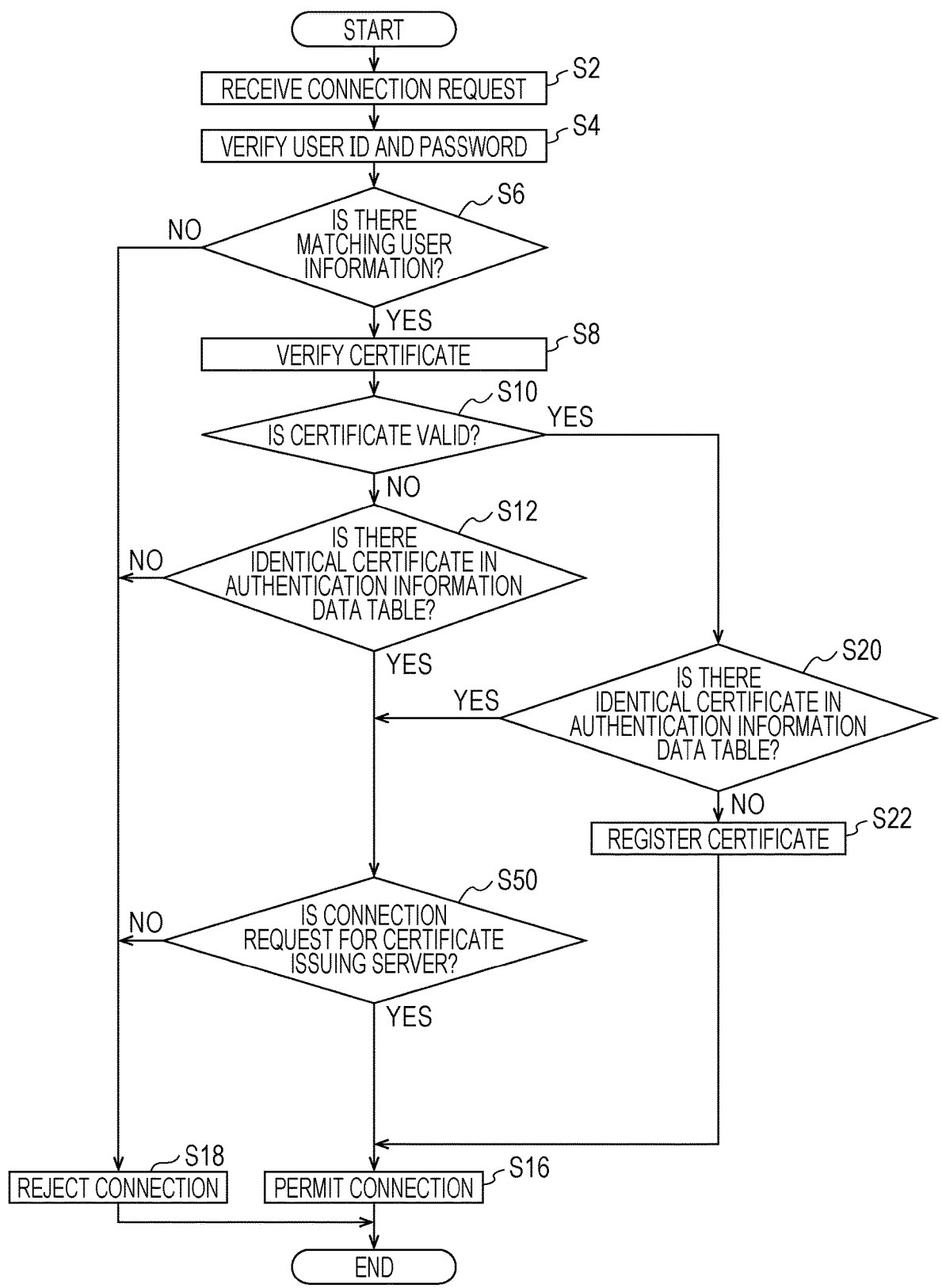
FIG. 16 is a flowchart for explaining processing of an authentication server according to Modification 6 of the second embodiment.

FIG. 16 is a flowchart for explaining processing of an authentication server 1 according to Modification 6 of the second embodiment. Referring to FIG. 16, a different point from the flowchart of FIG. 6 is that step S50 is added instead of step S14. Since other points are similar, the detailed description thereof will not be repeated.

When the authentication part 102 determines in step S12 that there is an identical certificate in the authentication information data table 20 (YES in step S12), the authentication part 102 determines whether or not a connection destination of the connection request is the certificate issuing server 56 (step S50).

When the authentication part 102 determines in step S50 that the connection destination in the connection request is the certificate issuing server 56 (YES in step S50), the authentication part 102 instructs the connection determination part 104, and the connection determination part 104 permits connection to the certificate issuing server 56 connected to the network 54 (step S16). When the authentication part 102 determines that the certificate is invalid but a certificate identical to the certificate has been registered in the authentication information data table with reference to the authentication information data table 20, and the connection destination is the certificate issuing server 56, the authentication part 102 instructs the connection determination part 104, and the connection determination part 104 permits connection to the certificate issuing server 56 designated as the connection destination by the information processing apparatus 50. By the information processing apparatus 50 being connected to the certificate issuing server 56, the user can acquire a valid certificate.

Then, the process ends (END).

Whereas, when the authentication part 102 determines in step S50 that the connection destination of the connection request is not the certificate issuing server 56 (NO in step S50), the authentication part 102 instructs the connection determination part 104, and the connection determination part 104 rejects connection to the network 54 (step S18).

Then, the process ends (END).

According to the method described above, even if the certificate is not valid, in a case where an identical certificate has been registered in the authentication information data table 20 and the connection destination is the certificate issuing server 56, the authentication part 102 instructs the connection determination part 104, and the connection determination part 104 permits connection to the certificate issuing server 56 designated as the connection destination by the information processing apparatus 50.

In Modification 6 of the second embodiment, even if the certificate is not valid, the authentication server 1 stores a certificate with which connection has been made in the past, and connection to the certificate issuing server 56 is exclusively enabled, when there is a connection request with the identical certificate using the certificate. Therefore, it is possible to provide user convenience while further ensuring security by a simple method.

(Modification 7)

Figure 17:
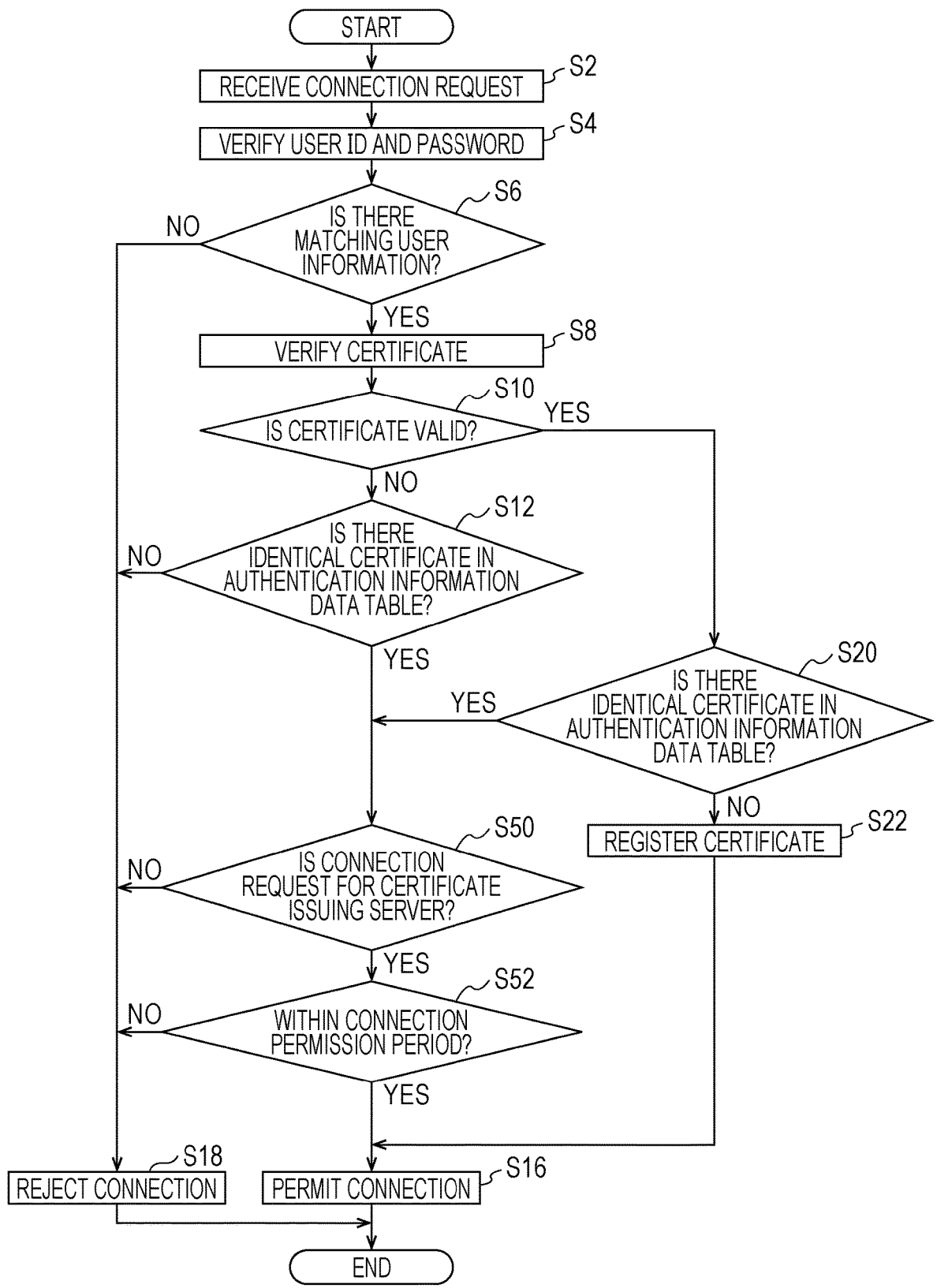
FIG. 17 is a flowchart for explaining processing of an authentication server according to Modification 7 of the second embodiment.

FIG. 17 is a flowchart for explaining processing of an authentication server 1 according to Modification 7 of the second embodiment. Referring to FIG. 17, a different point from the flowchart of FIG. 16 is that step S52 is further added. Since other points are similar, the detailed description thereof will not be repeated.

When the authentication part 102 determines in step S50 that the connection destination in the connection request is the certificate issuing server 56 (YES in step S50), the authentication part 102 determines whether or not the current date and time is within a connection permission period (step S52). For example, the connection permission period can be set to seven days after the validity term of the certificate. Note that the connection permission period can be changed to any period by the administrator.

When the authentication part 102 determines in step S52 that the current date and time is within the connection permission period (YES in step S52), the authentication part 102 instructs the connection determination part 104, and the connection determination part 104 permits connection to the certificate issuing server 56 connected to the network 54 (step S16). When the authentication part 102 determines that the certificate is invalid but a certificate identical to the certificate has been registered in the authentication information data table 20 with reference to the authentication information data table 20, and the connection destination is the certificate issuing server 56, the authentication part 102 instructs the connection determination part 104, and the connection determination part 104 permits connection to the certificate issuing server 56 designated as the connection destination by the information processing apparatus 50.

Then, the process ends (END).

Whereas, when the authentication part 102 determines in step S52 that the current date and time is not within the connection permission period (NO in step S52), the authentication part 102 instructs the connection determination part 104, and the connection determination part 104 rejects connection to the network 54 (step S18).

Then, the process ends (END).

According to the method described above, even if the certificate is not valid, in a case where an identical certificate has been registered in the authentication information data table 20, the connection destination is the certificate issuing server 56, and the current date and time is in the connection permission period, the authentication part 102 instructs the connection determination part 104, and the connection determination part 104 permits connection to the certificate issuing server 56 designated as the connection destination by the information processing apparatus 50.

In Modification 7 of the second embodiment, even if the certificate is not valid, the authentication server 1 stores a certificate with which connection has been made in the past, and connection to the certificate issuing server 56 is exclusively enabled within the connection permission period, when there is a connection request with the identical certificate using the certificate. Therefore, it is possible to provide user convenience while further ensuring security by a simple method.

Other Embodiments

Although the authentication processing based on the user information including the user ID and the password and the certificate data has been described above, for example, the authentication processing based on the certificate data alone may be executed without using the user information.

In addition, it is of course possible to adopt a configuration in which the above-described embodiments and modifications are freely combined.

(Supplementary Note)

The above-described embodiments include the following technical ideas.

[Configuration 1]

An authentication system including:

an information processing apparatus (50);

an authentication server (1) that is connected to the information processing apparatus via a first network and determines propriety of connection to a second network; and a certificate issuing server (56) that is connected to the authentication server via the second network and issues a certificate including a valid period and permitting the information processing apparatus to connect to the second network, in which the authentication server includes:

a certificate holding part (20) that holds a certificate with which connection has been permitted in a past; and an authentication part (102) that verifies a certificate transmitted from the information processing apparatus and determines propriety of connection to the second network, and the authentication part verifies a valid period of a certificate transmitted from the information processing apparatus, permits connection to the second network when the certificate is valid, determines, when the certificate is not valid, whether an identical certificate is held in the certificate holding part, and permits connection to the second network based on a determination result.

[Configuration 2]

The authentication system according to Configuration 1, in which based on the determination result, when an identical certificate is held in the certificate holding part, the authentication part determines whether or not a predetermined condition is satisfied, and when the authentication part determines that the predetermined condition is satisfied, the authentication part permits connection to the second network.

[Configuration 3]

The authentication system according to Configuration 2, in which the certificate holding part holds a date and time at which connection has been permitted in the past, together with the certificate, and the authentication part determines, as the predetermined condition, whether or not a current date and time is within a predetermined period from a date and time at which connection has been permitted in the past.

[Configuration 4]

The authentication system according to Configuration 2 or 3, in which the certificate holding part holds information related to the information processing apparatus together with the certificate, and the authentication part determines whether or not information related to the information processing apparatus matches, as the predetermined condition.

[Configuration 5]

The authentication system according to any one of Configurations 2 to 4, in which based on the determination result, when an identical certificate is held in the certificate holding part, the authentication part gives a notification to an administrator, and the authentication part determines whether or not an instruction of permission from the administrator is received, as the predetermined condition.

[Configuration 6]

The authentication system according to any one of Configurations 2 to 5, in which the certificate holding part holds, together with the certificate, a number of times of connection whose number is changed according to connection of the information processing apparatus, and the authentication part determines whether the number of times of connection is within a predetermined number of times, as the predetermined condition.

[Configuration 7]

The authentication system according to any one of Configurations 1 to 6, in which, based on the determination result, when an identical certificate is held in the certificate holding part, the authentication part exclusively permits connection to the certificate issuing server.

[Configuration 8]

The authentication system according to Configuration 7, in which, based on the determination result, when an identical certificate is held in the certificate holding part, the authentication part exclusively permits connection to the certificate issuing server when an elapsed time after the valid period is within a predetermined period.

[Configuration 9]

An authentication method of an authentication system that is connected to an information processing apparatus via a first network, is connected to a certificate issuing server that issues a certificate including a valid period and permitting connection to a second network, and determines propriety of connection to the second network, the authentication method including:

a step (S22) of holding a certificate with which connection has been permitted in a past; and a step of determining propriety of connection to the second network by verifying a certificate transmitted from the information processing apparatus, in which the step of determining propriety of connection includes:

a step (S8, S10) of verifying a valid period of a certificate transmitted from the information processing apparatus;

a step (S16) of permitting connection to the second network when the certificate is valid;

a step (S12) of determining, when the certificate is not valid, whether an identical certificate is held; and a step (S16) of permitting connection to the second network based on a determination result.

[Configuration 10]

An authentication program of an authentication system that is connected to an information processing apparatus via a first network, is connected to a certificate issuing server that issues a certificate including a valid period and permitting connection to a second network, and determines propriety of connection to the second network, in which a computer of the authentication system executes the authentication program to execute processing including:

a step (S22) of holding a certificate with which connection has been permitted in a past; and a step of determining propriety of connection to the second network by verifying a certificate transmitted from the information processing apparatus, and the step of determining propriety of connection includes:
a step (S8, S10) of verifying a valid period of a certificate transmitted from the information processing apparatus;
a step (S16) of permitting connection to the second network when the certificate is valid;
a step (S12) of determining, when the certificate is not valid, whether an identical certificate is held; and
a step (S16) of permitting connection to the second network based on a determination result.

Although embodiments of the present invention have been described and illustrated in detail, the disclosed embodiments are made for purposes of illustration and example only and not limitation. The scope of the present invention should be interpreted by terms of the appended claims, and it is intended to include all modifications within the meaning and scope equivalent to the claims.

What is claimed is:

1. An authentication system comprising:
an information processing apparatus;
a hardware processor that is connected to the information processing apparatus via a first network and determines propriety of connection to a second network; and
a certificate issuing server that is connected to the hardware processor via the second network and issues a certificate including a valid period and permitting the information processing apparatus to connect to the second network, wherein
the hardware processor
includes a certificate holding part that holds a first certificate with which connection has been permitted in a past,
verifies a second certificate transmitted from the information processing apparatus and determines propriety of connection to the second network,
verifies a valid period of the second certificate transmitted from the information processing apparatus,
permits connection to the second network when the second certificate is valid,
determines, when the second certificate is not valid due to the valid period of the second certificate, whether the second certificate is identical to the first certificate held in the certificate holding part, and
permits connection to the second network based on a determination result.

2. The authentication system according to claim 1, wherein
based on the determination result, when the second certificate is identical to the first certificate, the hardware processor determines whether or not a predetermined condition is satisfied, and
when the hardware processor determines that the predetermined condition is satisfied, the hardware processor permits connection to the second network.

3. The authentication system according to claim 2, wherein
the certificate holding part holds a date and time at which connection has been permitted in the past, together with the first certificate, and
the hardware processor determines, as the predetermined condition, whether or not a current date and time is within a predetermined period from a date and time at which connection has been permitted in the past.

4. The authentication system according to claim 2, wherein
the certificate holding part holds information related to the information processing apparatus together with the first certificate, and the hardware processor determines whether or not information related to the information processing apparatus matches, as the predetermined condition.

5. The authentication system according to claim 2, wherein
based on the determination result, when the second certificate is identical to the first certificate, the hardware processor gives a notification to an administrator, and
the hardware processor determines whether or not an instruction of permission from the administrator is received, as the predetermined condition.

6. The authentication system according to claim 2, wherein
the certificate holding part holds, together with the first certificate, a number of times of connection whose number is changed according to connection of the information processing apparatus, and
the hardware processor determines whether the number of times of connection is within a predetermined number of times, as the predetermined condition.

7. The authentication system according to claim 1, wherein, based on the determination result, when the second certificate is identical to the first certificate, the hardware processor exclusively permits connection to the certificate issuing server.

8. The authentication system according to claim 7, wherein, based on the determination result, when the second certificate is identical to the first certificate, the hardware processor exclusively permits connection to the certificate issuing server when an elapsed time after the valid period is within a predetermined period.

9. An authentication method of an authentication system that is connected to an information processing apparatus via a first network, is connected to a certificate issuing server that issues a certificate including a valid period and permitting connection to a second network, and determines propriety of connection to the second network,
the authentication method comprising:
holding a first certificate with which connection has been permitted in a past; and
determining propriety of connection to the second network by verifying a second certificate transmitted from the information processing apparatus, wherein
the determining propriety of connection includes:
verifying a valid period of the second certificate transmitted from the information processing apparatus;
permitting connection to the second network when the second certificate is valid;
determining, when the second certificate is not valid due to the valid period of the second certificate, whether the second certificate is identical to the first certificate; and
permitting connection to the second network based on a determination result.

10. A non-transitory recording medium storing a computer readable authentication program of an authentication system that is connected to an information processing apparatus via a first network, is connected to a certificate issuing server that issues a certificate including a valid period and permitting connection to a second network, and determines propriety of connection to the second network, wherein
a computer of the authentication system executes the authentication program to execute processing comprising:
holding a first certificate with which connection has been permitted in a past; and determining propriety of connection to the second network by verifying a second certificate transmitted from the information processing apparatus, and the determining propriety of connection includes:

verifying a valid period of the second certificate transmitted from the information processing apparatus;

permitting connection to the second network when the second certificate is valid;

determining, when the second certificate is not valid due to the valid period of the second certificate, whether the second certificate is identical to the first certificate; and permitting connection to the second network based on a determination result.

* * * * *